US009605661B2

(12) United States Patent
Aga et al.

(10) Patent No.: US 9,605,661 B2
(45) Date of Patent: Mar. 28, 2017

(54) SOLAR THERMAL POWER PLANT WITH INDEPENDENTLY CONTROLLABLE SUBSETS OF HELIOSTATS

(71) Applicant: ALSTOM Technology Ltd, Baden (CH)

(72) Inventors: Vipluv Aga, Zurich (CH); Marco Simiano, Zurich (CH); Erik Boschek, Zurich (CH)

(73) Assignee: ALSTOM Technology Ltd., Baden (CH)

( * ) Notice: Subject to any disclaimer, the term of this patent is extended or adjusted under 35 U.S.C. 154(b) by 431 days.

(21) Appl. No.: 14/085,032

(22) Filed: Nov. 20, 2013

(65) Prior Publication Data

US 2014/0075939 A1   Mar. 20, 2014

Related U.S. Application Data

(63) Continuation of application No. PCT/EP2012/058970, filed on May 15, 2012.

(30) Foreign Application Priority Data

May 20, 2011 (EP) .................................... 11166996

(51) Int. Cl.
 *F03G 6/06* (2006.01)
 *F01K 3/12* (2006.01)
 (Continued)

(52) U.S. Cl.
 CPC ............... *F03G 6/065* (2013.01); *F01K 3/12* (2013.01); *F03G 6/067* (2013.01); *F22B 1/006* (2013.01);
 (Continued)

(58) Field of Classification Search
 CPC . F03G 6/003; F03G 6/005; F03G 6/06; F03G 6/065; F03G 6/067; F03G 2006/008;
 (Continued)

(56) References Cited

U.S. PATENT DOCUMENTS 3,152,442 A * 10/1964 Rowekamp ................ F24J 2/06
                                                          126/641
4,117,682 A * 10/1978 Smith ...................... F03G 6/065
                                                          126/573
(Continued)

FOREIGN PATENT DOCUMENTS

CN          101413719 A        4/2009
CN          101876299 A       11/2010
(Continued)

*Primary Examiner* — Thomas Denion
*Assistant Examiner* — Laert Dounis
(74) *Attorney, Agent, or Firm* — Dority & Manning, P.A.

(57) ABSTRACT

A solar thermal power plant comprises a solar radiation receiver mounted on a tower surrounded by a heliostat field to receive solar radiation reflected by heliostats. A power generation circuit includes a steam turbine for driving an electrical generator to produce electrical power, and water in the power generation circuit is heated directly by solar radiation reflected onto the solar radiation receiver by the heliostat field to generate steam to drive the steam turbine. An energy storage circuit includes a thermal energy storage fluid, such as molten salt, which is capable of being heated directly by solar radiation reflected by the heliostat field. A heat exchanger is also provided for recovering thermal energy from the thermal energy storage fluid. The recovered thermal energy may then be used to generate steam to drive the steam turbine.

12 Claims, 4 Drawing Sheets

(51) Int. Cl.
  *F22B 1/00* (2006.01)
  *F24J 2/34* (2006.01)
(52) U.S. Cl.
  CPC ............... *F24J 2/34* (2013.01); *Y02E 10/46* (2013.01); *Y02E 60/14* (2013.01)
(58) Field of Classification Search
  CPC . F03G 2006/061; F03G 2006/062; F24J 2/34; F24J 2/345; Y02E 10/40–10/47; Y02E 60/14–60/147
  USPC ........... 60/641.8–641.15, 659; 126/617, 640, 126/641, 910
  See application file for complete search history.

(56) References Cited

U.S. PATENT DOCUMENTS

| | | | | |
|---|---|---|---|---|
| 4,164,123 A | * | 8/1979 | Smith | F03G 6/065 |
| | | | | 126/684 |
| 4,289,114 A | * | 9/1981 | Zadiraka | F22G 5/12 |
| | | | | 122/487 |
| 4,438,630 A | * | 3/1984 | Rowe | F01K 3/18 |
| | | | | 60/641.8 |
| 4,485,803 A | * | 12/1984 | Wiener | F03G 6/065 |
| | | | | 126/591 |
| 7,296,410 B2 | * | 11/2007 | Litwin | F03G 6/065 |
| | | | | 60/641.12 |
| 2005/0126170 A1 | | 6/2005 | Litwin | |
| 2009/0211249 A1 | * | 8/2009 | Wohrer | F01K 3/00 |
| | | | | 60/641.8 |
| 2009/0217921 A1 | * | 9/2009 | Gilon | F03G 6/06 |
| | | | | 126/600 |
| 2010/0319678 A1 | * | 12/2010 | Maemura | F24J 2/07 |
| | | | | 126/570 |
| 2012/0186251 A1 | * | 7/2012 | Epstein | F03G 6/065 |
| | | | | 60/641.11 |
| 2012/0255300 A1 | * | 10/2012 | Birnbaum | F03G 6/065 |
| | | | | 60/641.8 |

FOREIGN PATENT DOCUMENTS

| | | | | |
|---|---|---|---|---|
| DE | 30 03 962 | 8/1981 | | |
| DE | 10 2007 013 430 | 9/2008 | | |
| IL | WO 2011030331 A2 | * 3/2011 | ............. | F03G 6/065 |
| JP | 60 122865 | 7/1985 | | |
| JP | WO 2014068797 A1 | * 5/2014 | ............... | F01K 3/00 |

* cited by examiner

SOLAR THERMAL POWER PLANT WITH INDEPENDENTLY CONTROLLABLE SUBSETS OF HELIOSTATS

CROSS-REFERENCE TO RELATED APPLICATIONS

This application claims priority to PCT/EP2012/058970 filed May 15, 2012, which in turn claims priority to European application 11166996.6 filed May 20, 2011, both of which are hereby incorporated in their entireties.

TECHNICAL FIELD

The present invention relates generally to the field of concentrated solar power (CSP). Embodiments of the present invention relate in particular to a solar thermal power plant that utilises concentrated solar power to generate electricity.

BACKGROUND

Concentrated solar power (CSP) involves the use of lenses, mirrors or other optical apparatus to focus solar radiation from a large incident area onto a small area. The energy from the solar radiation is then used to generate electrical power. Concentrated solar power has the potential to become an important energy source in the future.

There have been many proposals for concentrated solar power technology. The technology believed to have the most potential for providing high efficiency power generation is the central receiver solar thermal power plant. This technology involves the use of a solar radiation receiver, mounted atop a tower, to receive solar radiation that is reflected to be incident upon it by an array of tracking reflectors located in a solar field around the tower. The tracking reflectors are typically heliostats and the array of heliostats is commonly referred to as a heliostat field.

Figure 1:
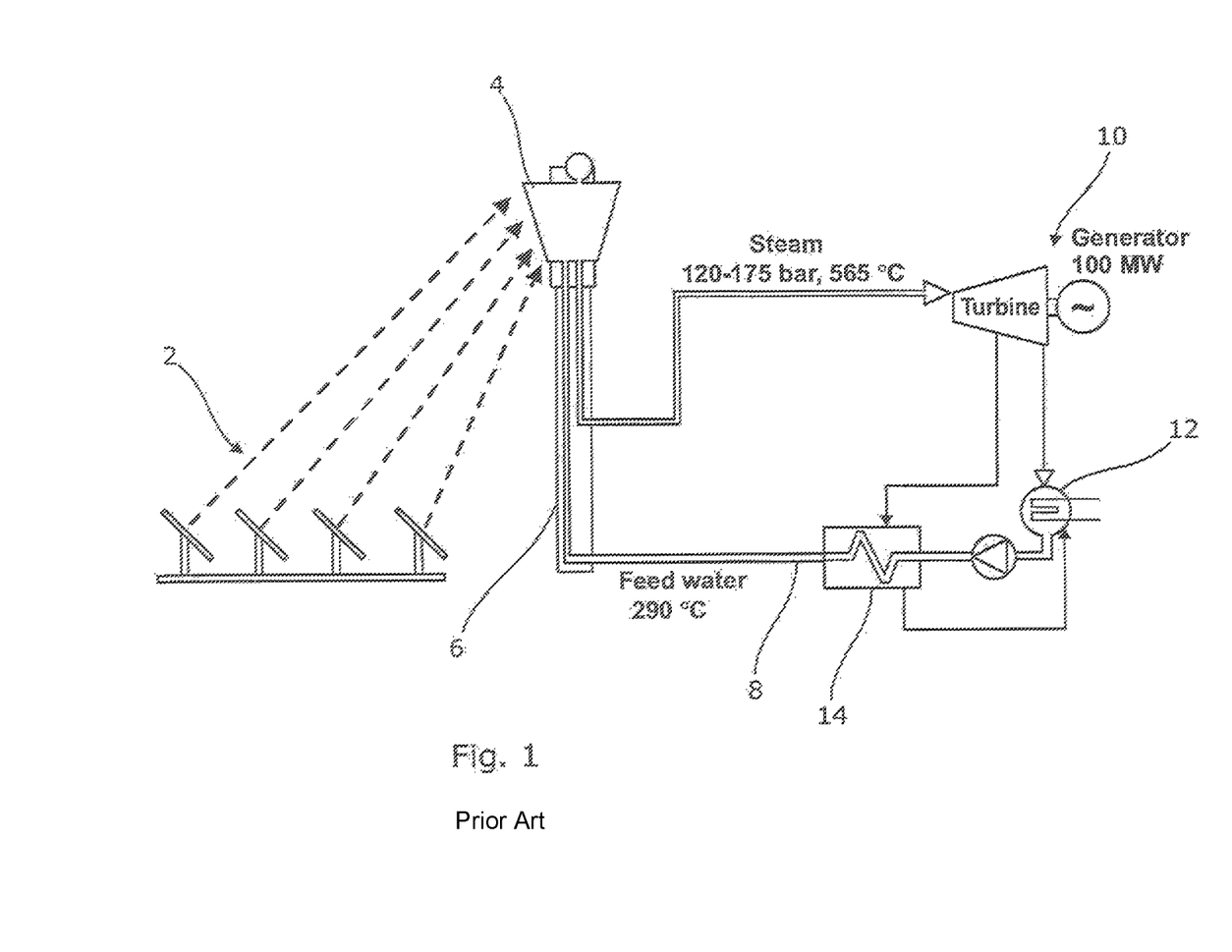
FIG. 1 is a diagrammatic illustration of a known direct steam concentrated solar thermal power plant.

FIG. 1 is a diagrammatic illustration of a conventional direct steam concentrated solar thermal power plant in which solar radiation is reflected by a heliostat field 2 to be incident upon a solar radiation receiver 4 mounted atop a tower 6. The reflected solar radiation directly heats water circulating in a power generation circuit 8. This generates superheated steam which is used to drive a steam turbine generator set 10, and thereby generate electrical power, in a well-known manner using the Rankine cycle. In addition to the steam turbine generator set 10, the power generation circuit 8 includes an air-cooled condenser 12 and a feed water heater 14.

Direct steam concentrated solar thermal power plants can only operate effectively during daylight hours at times when the available solar radiation reflected to be incident upon the solar radiation receiver 4 is sufficient to generate superheated steam at the required pressure and temperature in the power generation circuit 8. This is because the high pressure and high temperature steam cannot be stored easily for later use.

In order to overcome this drawback, direct steam concentrated solar thermal power plants with energy storage capability have been proposed. These plants use high specific heat capacity thermal energy storage fluid, typically a molten salt or a mixture of different molten salts, for energy storage. Thermal energy is stored during a charging cycle by heating the molten salt and the thermal energy is subsequently recovered during a discharging cycle to heat water, and thereby generate steam, in a power generation circuit. The generated steam is then used to drive a steam turbine generator set to generate electrical power.

A first heat exchanger is needed to transfer thermal energy from steam not used to drive the steam turbine to the molten salt during the charging cycle. A second heat exchanger is also needed to recover thermal energy from the hot molten salt, and transfer it to the power generation circuit, during the discharging cycle. There are, therefore, multiple heat transfer stages, which reduces the efficiency of this type of solar thermal power plant. In particular, as the steam cools during the charging cycle, it undergoes a phase change whereas the molten salt does not. The amount of thermal energy transfer to the molten salt is, thus, limited thereby limiting the maximum attainable temperature of the molten salt and resulting in what is known as a 'pinch point loss'. Consequently, when thermal energy is recovered from the hot molten salt to generate steam in the power generation circuit, the generated steam attains a significantly lower temperature and pressure than the steam originally used to heat the molten salt. This significantly reduces the efficiency of this type of solar thermal power plant. Furthermore, the lower steam pressure in the power generation circuit may be insufficient to run the steam turbine generator set at full load, meaning that the power generation requirement cannot be met.

Another type of concentrated solar thermal power plant utilises a solar radiation receiver to directly heat a high specific heat capacity thermal energy storage fluid such as molten salt. In this type of plant, thermal energy is recovered from the molten salt to heat water in a power generation circuit, and thereby generate steam to drive a steam turbine generator set, irrespective of the prevailing daylight conditions. This type of solar thermal power plant is generally less efficient than a direct steam concentrated solar thermal power plant during daylight hours because the steam in the power generation circuit is generated at all times through indirect heating, by recovering thermal energy from the molten salt in a heat exchanger. Furthermore, this type of solar thermal power plant is generally less attractive than a direct steam concentrated solar thermal power plant because its construction is more complex (and hence more costly) and the technology is still at a relatively early stage of development.

It would, therefore, be desirable to provide a solar thermal power plant having improved efficiency and operational flexibility.

SUMMARY

According to one aspect of the present invention, there is provided a solar thermal power plant comprising:—
  a tower;
  a plurality of heliostats surrounding the tower and forming a heliostat field;
  a solar radiation receiver mounted on the tower to receive solar radiation reflected by the heliostat field;
  a power generation circuit including a steam turbine for driving an electrical generator to produce electrical power, water in the power generation circuit being capable of being heated directly by solar radiation reflected onto the solar radiation receiver by the heliostat field to generate steam to drive the steam turbine;
  an energy storage circuit including a thermal energy storage fluid capable of being heated directly by solar radiation reflected by the heliostat field; and a heat exchanger for recovering thermal energy from the thermal energy storage fluid in the energy storage circuit.

The solar radiation receiver and associated power generation circuit provides highly efficient direct steam generation during daylight hours, particularly during sunny conditions when the solar radiation reflected by the heliostat field onto the solar radiation receiver is sufficient to generate superheated steam in the power generation circuit. Thermal energy can also be simultaneously stored in the energy storage circuit during a charging cycle, for subsequent recovery during a discharging cycle, thereby increasing operational efficiency and flexibility relative to a conventional direct steam solar thermal power plant of the type described above. Because the thermal energy storage fluid circulating in the energy storage circuit is heated directly by solar radiation, rather than indirectly from steam circulating in a heating circuit, a heat exchanger is not needed to transfer heat from the steam to the thermal energy storage fluid and this results in a significant improvement in the operational efficiency of the solar thermal power plant. Additionally, the heat exchanger that is provided to recover thermal energy from the thermal energy storage fluid is significantly smaller than the heat exchanger employed in a dedicated molten salt power plant of the type described above.

Thermal energy recovered from the thermal energy storage fluid during the discharging cycle can be used for any purpose.

The recovered thermal energy can most conveniently be used to generate steam for the power generation circuit of the solar thermal power plant at times when insufficient solar radiation is reflected onto the solar radiation receiver to generate steam, typically superheated steam, at the required temperature and pressure in the power generation circuit, for example during non-daylight hours or cloudy conditions. Accordingly, the heat exchanger may be arranged to generate steam for the power generation circuit and, more particularly, may be arranged to transfer the recovered thermal energy to the power generation circuit to support steam generation in the power generation circuit. The recovered thermal energy transferred to the power generation circuit may heat the fluid, namely water or steam, circulating in the power generation circuit to provide steam at a desired temperature and pressure. The steam generated indirectly using the thermal energy recovered by the heat exchanger can be used in the reheat cycle of the steam turbine, in the high pressure stage of the steam turbine, to power the complete operating cycle of the steam turbine or to preheat feed water for the steam turbine. It will be appreciated that use of the recovered thermal energy in this way significantly improves the operational efficiency and flexibility of the solar thermal power plant.

The recovered thermal energy can be used at times when sufficient solar radiation is reflected onto the solar radiation receiver to generate steam at the required temperature and pressure to drive the steam turbine, for example to support the start-up of the solar thermal power plant, to reduce the plant start-up time, during transient operation of the solar thermal power plant or to precondition one or more plant components, for example the solar radiation receiver.

The recovered thermal energy could conceivably be supplied to a hybrid power plant or a desalination plant, typically located near to the solar thermal power plant.

The thermal energy storage fluid is typically a liquid. The thermal energy storage liquid may be a molten salt, which may for example be capable of being heated to a maximum operating temperature in the region of 580° C. for the effective storage of thermal energy. The molten salt may be a nitrate salt or a carbonate salt, although other forms of molten salt are entirely within the scope of the present invention, e.g., a mixture of salts.

The energy storage circuit may include two fluid storage locations, comprising two tanks for the thermal energy storage fluid, one of which may be a high temperature fluid storage tank and the other of which may be a low temperature fluid storage tank. The energy storage circuit may alternatively include both fluid storage locations in a single thermocline fluid storage tank, for example with high temperature fluid at the top and low temperature fluid at the bottom, although these single tank storage solutions are still under development. The heat exchanger may be positioned in the energy storage circuit between the high temperature and low temperature fluid storage locations, enabling thermal energy to be recovered from the thermal energy storage fluid as it circulates in the energy storage circuit from the high temperature fluid storage location to the low temperature fluid storage location.

In one configuration of the solar thermal power plant, the thermal energy storage fluid may be heated directly by solar radiation reflected onto the solar radiation receiver mounted on the tower. This configuration employs a single radiation receiver mounted atop the tower. Accordingly, the solar radiation receiver may include one or more first receiver panels for receiving solar radiation reflected by the heliostat field and transferring thermal energy provided by the reflected solar radiation directly to the fluid, namely water or steam, circulating in the power generation circuit. The solar radiation receiver may also include one or more second receiver panels for receiving solar radiation reflected by the heliostat field and transferring thermal energy provided by the reflected solar radiation directly to the thermal energy storage fluid circulating in the energy storage circuit.

In another configuration, the solar thermal power plant may include a further solar radiation receiver which may receive solar radiation reflected by the heliostat field and transfer thermal energy provided by the reflected solar radiation directly to the thermal energy storage fluid circulating in the energy storage circuit.

The further solar radiation receiver can be mounted on the tower so that it receives solar radiation reflected by the heliostat field surrounding the tower. Since the solar radiation receiver for the power generation circuit and the further solar radiation receiver for the energy storage circuit are mounted on the same tower, only a single tower is needed.

The solar thermal power plant may include a further tower on which the further solar radiation receiver may be mounted. The heliostat field may surround the tower and the further tower. This may simplify the construction of the solar thermal power plant because the further solar radiation receiver for the energy storage circuit is typically smaller than the solar radiation receiver for the power generation circuit. This results in a consequential and beneficial reduction in the size of the further tower.

The position of a subset of the plurality of heliostats in the heliostat field may be adjustable to selectively direct the solar radiation to provide thermal energy either directly to the power generation circuit or directly to the energy storage circuit. The operational efficiency of the solar thermal power plant can, thus, be optimised according to requirements.

When the solar thermal power plant includes a solar radiation receiver having one or more first and second receiver panels, the position of a subset of the plurality of heliostats in the heliostat field may be adjustable to selectively direct solar radiation onto either the first receiver panel(s) or the second receiver panel(s).

When the solar thermal power plant includes a solar radiation receiver and a further solar radiation receiver, the position of a subset of the plurality of heliostats in the heliostat field may be adjustable to selectively direct solar radiation onto either the solar radiation receiver or the further solar radiation receiver. This selective adjustment of the subset of heliostats can be provided when the further solar radiation receiver is mounted on the same tower as the solar radiation receiver or on a further tower.

DETAILED DESCRIPTION

Embodiments of the present invention will now be described by way of example only and with reference to the accompanying drawings.

Figure 2:
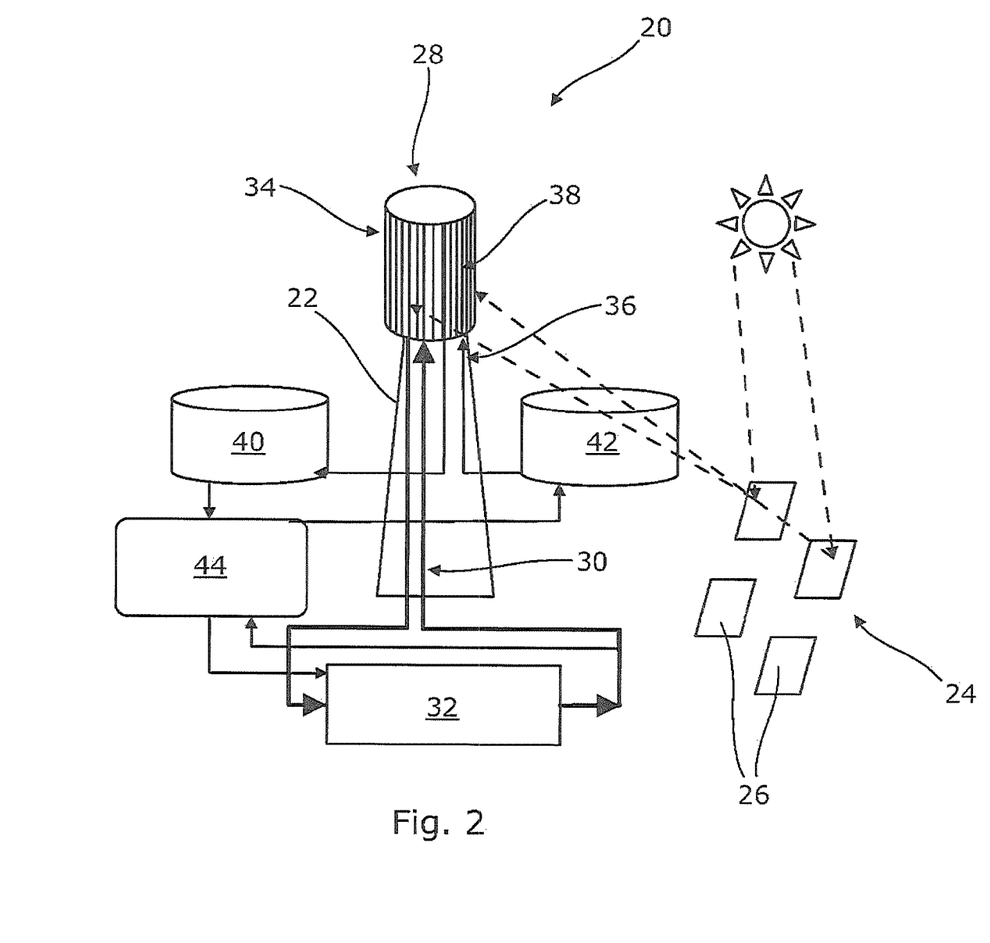
FIG. 2 is a diagrammatic illustration of a first configuration of a solar thermal power plant according to the present invention.

Referring to FIG. 2, there is shown a first configuration of a solar thermal power plant 20 comprising a tower 22 and a heliostat field 24 surrounding the tower 22. The heliostat field 24 comprises a plurality of individual tracking heliostats 26 and the position of each heliostat 26 is adjusted by a suitably programmed computer controlled tracking system to track the movement of the sun. A solar radiation receiver 28 is mounted on top of the tower 22 and solar radiation is reflected by the heliostat field 24 to be incident upon the solar radiation receiver 28.

The power plant 20 includes a direct steam power generation circuit 30 in which steam is generated directly by thermal energy arising from the solar radiation reflected by the heliostat field 24 to be incident upon the solar radiation receiver 28. More particularly, water circulating in the power generation circuit 30 is heated by the thermal energy, thereby producing superheated steam at a pressure in the region of 120 to 175 bar and a temperature in the region of 565° C. The superheated steam is circulated through a power generating system 32 to thereby generate electrical power, and the power generating system 32 typically comprises a steam turbine generator set through which the superheated steam is expanded, an air-cooled condenser and a feed water heater.

In order to directly heat the water circulating in the power generation circuit 30, the solar radiation receiver 28 includes a plurality of first receiver panels 34 arranged circumferentially around the solar radiation receiver 28. Each of the first receiver panels 34 comprises a plurality of parallel vertically arranged, small-diameter, tubes which are connected at their upper and lower ends by headers. The first receiver panels 34 are connected in series. Water circulating in the power generation circuit 30 flows through the tubes in the first receiver panels 34 where it is directly heated by the thermal energy arising from the solar radiation reflected by the heliostat field 24 to be incident upon the first receiver panels 34. Although multiple circumferentially arranged first receiver panels 34 may be preferred, a single first receiver panel 34 could be provided.

In addition to the direct steam power generation circuit 30, the power plant 20 includes an energy storage circuit 36 which utilises molten salt, e.g., a nitrate salt or a carbonate salt, or a salt mixture, such as a mixture of 60% sodium nitrate and 40% potassium nitrate, to store thermal energy. Like the water circulating in the power generation circuit 30, the molten salt is heated directly by thermal energy arising from the solar radiation reflected by the heliostat field 24 to be incident upon the solar radiation receiver 28.

In order to directly heat the circulating molten salt, the solar radiation receiver 28 includes a plurality of second receiver panels 38 arranged circumferentially around the solar radiation receiver 28. Each of the second receiver panels 38 comprises a plurality of parallel vertically arranged, small-diameter, tubes which are connected at their upper and lower ends by headers. The second receiver panels 38 are also connected in series and form a second fluid circuit to the series-connected first receiver panels 34. Molten salt circulating in the energy storage circuit 36 flows through the tubes in the second receiver panels 38 where it is directly heated by thermal energy arising from the solar radiation reflected by the heliostat field 24 to be incident upon the second receiver panels 38. The first and second receiver panels 36, 38 are typically alternately arranged around the solar radiation receiver 28 in the circumferential direction. Although multiple circumferentially arranged second receiver panels 38 may be preferred, a single second receiver panel 38 could be provided.

The energy storage circuit 36 includes an insulated hot salt storage tank 40 and a cold salt storage tank 42. Molten salt that has been heated directly, during a charging cycle, by solar radiation reflected onto the second receiver panels 38 is pumped to the hot salt storage tank 40. The molten salt is typically heated to a storage temperature in the region of 580° C. A heat exchanger 44 is arranged between the two storage tanks 40, 42 to recover heat from the hot molten salt as it circulates from the hot salt storage tank 40 to the cold salt storage tank 42 during a discharging cycle. The heat exchanger 44 is operatively associated with the power generation circuit 30 and heat recovered from the molten salt by the heat exchanger 44 through steam generation is transferred to the power generation circuit 30 where it can be used to support electrical power generation.

The solar thermal power plant 20 can be operated in different modes depending on the prevailing power generation requirements and the amount of solar radiation that is available. In order to vary the operating mode, a subset of the plurality of heliostats 26 in the heliostat field 24 is controllable by the computer controlled tracking system so that the heliostats 26 can reflect solar radiation to be incident upon either the first receiver panels 34 associated with the power generation circuit 30 or the second receiver panels 38 associated with the energy storage circuit 36. Some of the heliostats 26 are arranged so that they are dedicated exclusively to reflecting solar radiation to be incident only upon the first receiver panels 34 associated with the power generation circuit 30.

During daylight hours, the power plant can be operated in a hybrid generation/storage operating mode provided that there is a sufficient amount of solar radiation. In this hybrid operating mode, the position of at least some of the subset of heliostats 26 is controlled to direct solar radiation onto the second receiver panels 38 associated with the energy storage circuit 36. In this hybrid operating mode, steam is generated directly in the power generation circuit 30 by the solar radiation that is reflected onto the first receiver panels 34 by the dedicated heliostats 26 and is employed by the power generating system 32 to provide immediate generation of electrical power. Furthermore, the molten salt circulating through the second receiver panels 38 in the energy storage circuit 36 is heated by the solar radiation reflected onto the second receiver panels 38 during a charging cycle and the heated molten salt is pumped to the hot salt storage tank 40. In this hybrid operating mode, the power plant 20 generates electrical power via the power generation circuit 30 and power generating system 32 and at the same time stores thermal energy via the energy storage circuit 36. In both cases, the solar radiation reflected by the heliostat field 24 provides direct heating of the water circulating in the power generation circuit 30 and the molten salt circulating in the energy storage circuit 36, thereby maximising the efficiency of the power plant 20.

If there is insufficient solar radiation during daylight hours to operate the power plant 20 in the hybrid generation/storage operating mode, it can be operated in a generation only mode in which the position of the subset of heliostats 26 is controlled to direct solar radiation onto the first receiver panels 34 associated with the power generation circuit 30. This ensures that heliostat field 24 directs all of the available solar radiation to the immediate production of steam in the power generation circuit 30.

At times when there is insufficient solar energy to directly heat the water circulating in the first receiver panels 34 to provide steam at the desired pressure and temperature for efficient operation of the power generating system 32, the power plant 20 can be operated in an energy recovery mode to support the generation of steam in the power generation circuit 30. In this operating mode, the heat exchanger 44 is used to recover thermal energy from hot molten salt during a discharging cycle as the hot molten salt flows from the hot salt storage tank 40 to the cold salt storage tank 42. This operating mode can be used during non-daylight hours when solar radiation is not available to generate steam in the power generation circuit 30. It can also be used during daylight hours if there is insufficient solar radiation to provide steam at the desired pressure and temperature in the power generation circuit 30, for example during overcast conditions.

Figure 3:
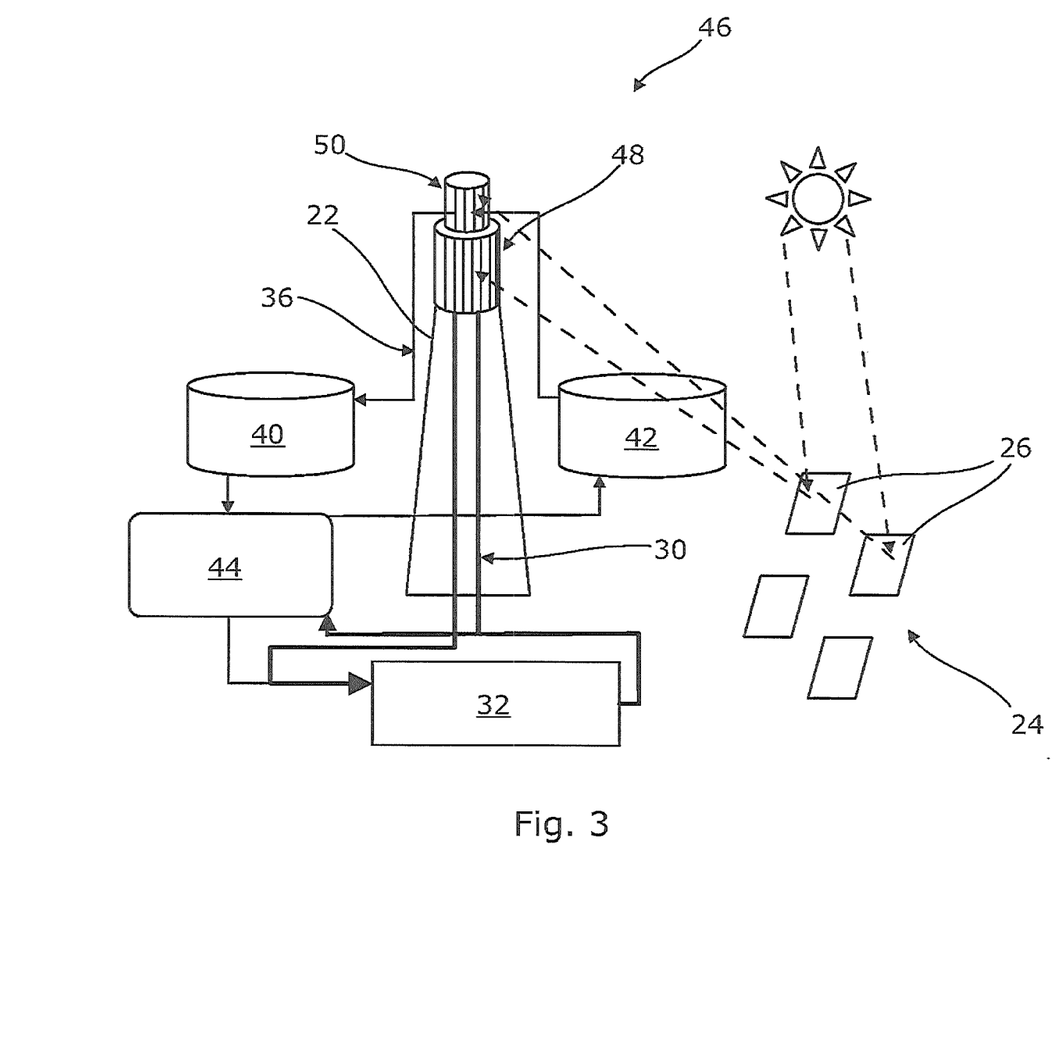
FIG. 3 is a diagrammatic illustration of a second configuration of a solar thermal power plant according to the present invention.

Referring to FIG. 3, there is shown a second configuration of a solar thermal power plant 46. The power plant 46 shares many features in common with the power plant 20 of FIG. 2 and corresponding components are, therefore, designated with corresponding reference numerals.

The power plant 46 includes two solar radiation receivers 48, 50, both of which are mounted on top of the same tower 22. The first solar radiation receiver 48 is associated with the power generation circuit 30 and includes one or more receiver panels onto which solar radiation is reflected by the heliostat field 24. Water circulating through the first solar radiation receiver 48 is, thus, directly heated to generate steam for the power generating system 32. The second solar radiation receiver 50 is associated with the energy storage circuit 36 and includes one or more receiver panels onto which solar radiation can be reflected by the heliostat field 24. Molten salt circulating through the second solar radiation receiver 50 is, thus, directly heated during a charging cycle and subsequently pumped to a hot salt storage tank 40. Heat can subsequently be recovered from the hot molten salt, via a heat exchanger 44, as described above in connection with the power plant 20 of FIG. 2.

The first solar radiation receiver 48, associated with the power generation circuit 30, is mounted below, and larger than, the second solar radiation receiver 50 associated with the energy storage circuit 36. It should, however, be understood that the relative positions and dimensions of the first and second solar radiation receivers 48, 50 will in practice be selected based on a number of factors, including structural and thermal considerations and the energy storage requirements of the power plant 46. For example, the positions of the first and second solar radiation receivers 48, 50 could be reversed or they could be arranged side-by-side.

The power plant 46 can be operated in different modes as described above in connection with the power plant 20. Like the power plant 20, the operating mode of the power plant 46 can be varied by controlling the position of a subset of the plurality of heliostats 26 in the heliostat field 24. This enables solar radiation to be reflected exclusively onto the first solar radiation receiver 48 during a generation only operating mode or onto both the first and second solar radiation receivers 48, 50 during a hybrid generation/storage operating mode. The heat exchanger 44 is used to recover energy from the hot molten salt during the energy recovery mode.

Figure 4:
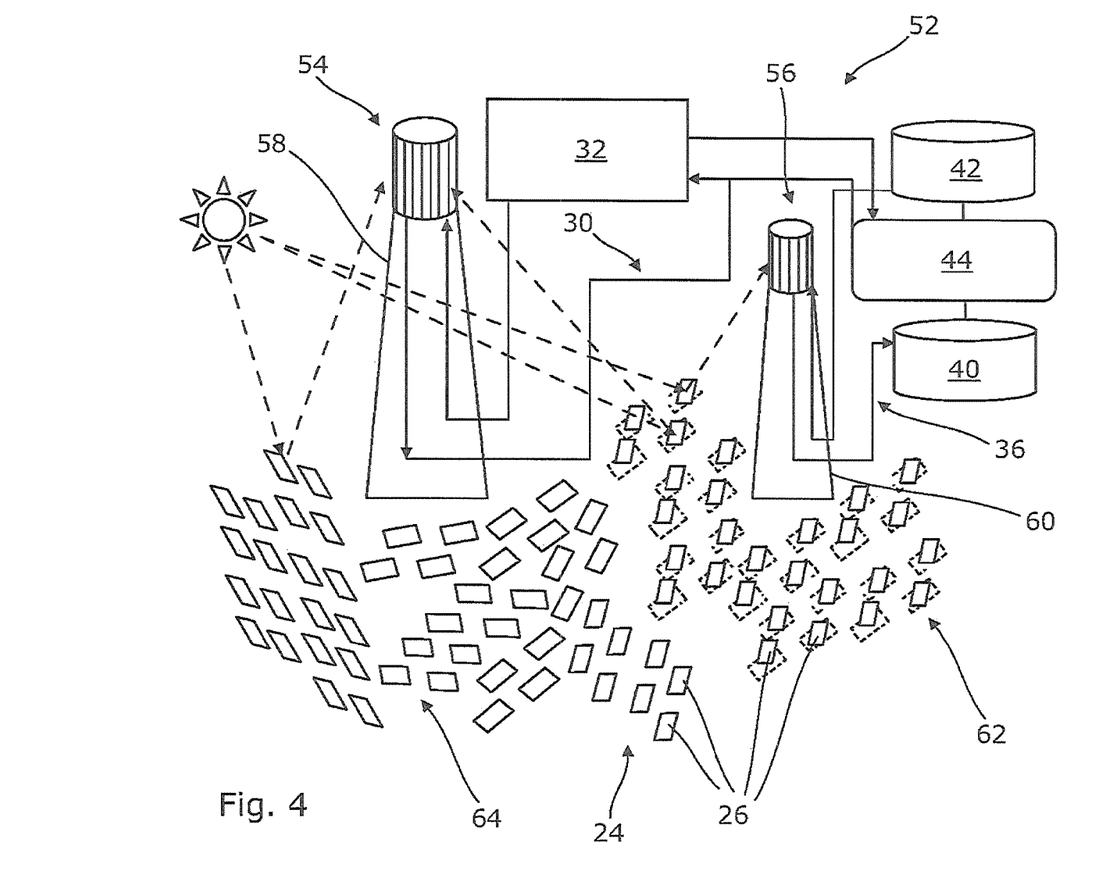
FIG. 4 is a diagrammatic illustration of a third configuration of a solar thermal power plant according to the present invention.

Referring to FIG. 4, there is shown a third configuration of a solar thermal power plant 52. The power plant 52 shares many features in common with the power plants 20 and 46 of FIGS. 2 and 3 and corresponding components are, therefore, designated with corresponding reference numerals.

Like the power plant 46 of FIG. 3, the power plant 52 employs two separate solar radiation receivers 54, 56. The first solar radiation receiver 54 is mounted on top of a first tower 58 and is associated with the power generation circuit 30. The first solar radiation receiver 54 includes one or more receiver panels onto which solar radiation is reflected by the heliostat field 24 to directly heat water circulating through the first solar radiation receiver 54. The second solar radiation receiver 56 is mounted on top of a second tower 60, spaced apart from the first tower 58, and is associated with the energy storage circuit 36. The second solar radiation receiver 56 includes one or more receiver panels onto which solar radiation is reflected by the heliostat field 24. Molten salt circulating through the second solar radiation receiver 56 is, thus, directly heated during a charging cycle and subsequently pumped to a hot salt storage tank 40. Heat can subsequently be recovered from the hot molten salt, via a heat exchanger 44, as described above in connection with the power plants 20, 46 of FIGS. 2 and 3.

The power plant 52 can be operated in different modes as described above in connection with the power plants 20, 46. The daytime operating mode of the power plant 52 can be varied by controlling the position of a subset 62 of the plurality of heliostats 26 in the heliostat field 24. This enables solar radiation to be reflected by the subset 62 of heliostats onto the first solar radiation receiver 54 mounted on the first tower 58 during a generation only operating mode or onto the second solar radiation receiver 56 mounted on the second tower 60 during a hybrid generation/storage operating mode. Some of the heliostats 26 in the heliostat field 24, shown in FIG. 4 as a subset 64, are arranged so that they exclusively reflect solar radiation onto the first solar radiation receiver 54 mounted on the first tower 58. The heat exchanger 44 is used to recover energy from the hot molten salt during the energy recovery mode.

Although embodiments of the present invention have been described in the preceding paragraphs, it should be understood that various modifications may be made to those embodiments without departing from the scope of the present invention.

For example, although the heat exchanger 44 is arranged so that thermal energy recovered from the hot molten salt is transferred to the power generation circuit 30 to support steam generation, the recovered heat could be used for other purposes such as those described earlier in this specification.

In the power plant 20 of FIG. 2, the first and second receiver panels 34, 38 could be arranged to be adjacent to each other in the vertical direction, rather than the circumferential direction.

Although the thermal energy storage fluid is typically a molten salt, other thermal energy storage fluids having a high specific heat capacity could be employed.

In order to simplify the construction of the solar thermal power plants 20, 46, 52 described above with reference to FIGS. 2 to 4, the separate hot salt and cold salt storage tanks 40, 42 could be replaced with a single thermocline molten salt storage tank. In a thermocline molten salt storage tank, hot molten salt is typically stored at the top of the tank and cold molten salt is typically stored at the bottom of the tank. In this case, the heat exchanger 44 would be positioned between the hot and cold molten salt storage locations, so that heat can be recovered from the hot molten salt as it flows from the hot molten salt storage location at the top of the tank to the cold molten salt storage location at the bottom of the tank.

The invention claimed is:

1. A solar thermal power plant comprising:—
a first tower;
a plurality of heliostats adjacent the tower and forming a heliostat field, the plurality of heliostats comprising a controllable first subset of the heliostats and a second separately controllable second subset of the heliostats;
a solar radiation receiver mounted on the tower to receive solar radiation reflected by the heliostat field;
the solar radiation receiver comprising first receiver panels mounted on the tower;
second receiver panels separate from the first receiver panels;
a power generation circuit including a steam turbine for driving an electrical generator to produce electrical power, water in the power generation circuit being capable of being heated directly by solar radiation reflected onto the first receiver panels by the heliostat field to generate steam to drive the steam turbine;
an energy storage circuit including a thermal energy storage fluid that circulates through the second receiver panels and is capable of being heated directly by solar radiation reflected by the second subset of heliostats of the heliostat field onto the second receiver panels;
a heat exchanger for recovering thermal energy from the thermal energy storage fluid in the energy storage circuit in a recovery mode of the solar thermal power plant when there is insufficient thermal energy to directly heat the water circulating in the first receiver panels, the heat exchanger configured in the power generation circuit such that energy from the energy storage fluid is transferred directly to the water in the power generation circuit to generate steam in the heat exchanger in the recovery mode;
the first subset of heliostats controlled by a computer tracking system to direct solar radiation exclusively to the first receiver panels;
the second subset of heliostats controlled by the computer tracking system to direct solar radiation to either of the first or second receiver panels; and
further comprising a second tower spaced from the first tower, the second receiver panels configured on the second tower.

2. The solar thermal power plant according to claim 1, wherein the thermal energy storage fluid is a liquid.

3. The solar thermal power plant according to claim 2, wherein the thermal energy storage liquid comprises a molten salt or a mixture of molten salts.

4. The solar thermal power plant according to claim 1, wherein the energy storage circuit includes high temperature and low temperature fluid storage tanks respectively for storing high temperature and low temperature thermal storage fluid or alternatively a single thermocline fluid storage tank for storing both high temperature and low temperature thermal storage fluid.

5. The solar thermal power plant according to claim 4, wherein the heat exchanger is positioned between the high temperature and low temperature thermal fluid storage locations.

6. A solar thermal power plant comprising:—
a first tower;
a plurality of heliostats adjacent the tower and forming a heliostat field, the plurality of heliostats comprising a controllable first subset of the heliostats and a second separately controllable second subset of the heliostats;
a solar radiation receiver mounted on the tower to receive solar radiation reflected by the heliostat field;
the solar radiation receiver comprising first receiver panels mounted on the tower;
second receiver panels separate from the first receiver panels;
a power generation circuit including a steam turbine for driving an electrical generator to produce electrical power, water in the power generation circuit being capable of being heated directly by solar radiation reflected onto the first receiver panels by the heliostat field to generate steam to drive the steam turbine;
an energy storage circuit including a thermal energy storage fluid that circulates through the second receiver panels and is capable of being heated directly by solar radiation reflected by the second subset of heliostats of the heliostat field onto the second receiver panels;
a heat exchanger for recovering thermal energy from the thermal energy storage fluid in the energy storage circuit in a recovery mode of the solar thermal power plant when there is insufficient thermal energy to directly heat the water circulating in the first receiver panels, the heat exchanger configured in the power generation circuit such that energy from the energy storage fluid is transferred directly to the water in the power generation circuit to generate steam in the heat exchanger in the recovery mode;
the first subset of heliostats controlled by a computer tracking system to direct solar radiation exclusively to the first receiver panels;
the second subset of heliostats controlled by the computer tracking system to direct solar radiation to either of the first or second receiver panels; and
wherein the first and second receiver panels are configured on the first tower.

7. The solar thermal power plant according to claim 6, wherein the second receiver panels are disposed above the first receiver panels on the first tower.

8. The solar thermal power plant according to claim 6, wherein the first and second receiver panels are disposed at a same height on the first tower.

9. The solar thermal power plant according to claim 6, wherein the thermal energy storage fluid is a liquid.

10. The solar thermal power plant according to claim 9, wherein the thermal energy storage liquid comprises a molten salt or a mixture of molten salts.

11. The solar thermal power plant according to claim 6, wherein the energy storage circuit includes high temperature and low temperature fluid storage tanks respectively for storing high temperature and low temperature thermal storage fluid or alternatively a single thermocline fluid storage tank for storing both high temperature and low temperature thermal storage fluid.

12. The solar thermal power plant according to claim 11, wherein the heat exchanger is positioned between the high temperature and low temperature thermal fluid storage locations.

* * * * *